United States Patent [19]

Maier

[11] 3,965,520

[45] June 29, 1976

[54] BRUSH AND CLEANING COMPOSITION FOR PHONOGRAPH RECORDS

[76] Inventor: Bruce R. Maier, 2802 Terry Lane, Columbia, Mo. 65201

[22] Filed: Oct. 15, 1974

[21] Appl. No.: 514,430

Related U.S. Application Data

[62] Division of Ser. No. 260,828, June 8, 1972, abandoned.

[52] U.S. Cl.............................. 15/104.94; 252/106; 274/47
[51] Int. Cl.$^2$...................... A46B 9/02; A46B 11/00; C11D 3/48
[58] Field of Search........ 15/104.93, 104.94, 210 R; 274/47

[56] References Cited

UNITED STATES PATENTS

| | | | |
|---|---|---|---|
| 3,421,171 | 1/1969 | Tsuruzawa | 15/172 |
| 3,619,846 | 11/1971 | Krusche et al. | 15/172 |
| 3,639,293 | 2/1972 | Shema et al. | 252/106 X |
| 3,800,353 | 4/1974 | Roth | 15/231 |

FOREIGN PATENTS OR APPLICATIONS

| | | | |
|---|---|---|---|
| 1,198,582 | 8/1965 | Germany | 274/47 |
| 1,095,435 | 12/1960 | Germany | 252/180 |
| 2,020,313 | 12/1971 | Germany | 15/231 |

Primary Examiner—Daniel Blum
Attorney, Agent, or Firm—Paul M. Denk

[57] ABSTRACT

A cleaning composition with anti-microbial properties and for use in cleansing metal, plastic, or glass surfaces, the mixture includes a surfactant, an emulsifier, an anti-microbe, all intermixed in a liquid carrier. This composition is most effective when used in combination with a brush design having a cloth cover whose projecting filaments form a pile that are maintained angularly, and which when brushed against said pile effectively loosens dirt particles from the foregoing type surfaces. In a method of use of this invention, the cleaning composition may be applied to the leading edge of said brush pile, with the brush then being moved in a rolling action upon the surface being cleaned, as for example, phonograph record surfaces, thereby to effectively clean any dirt or microbial particles that may be clogging the micro-grooves of the same.

3 Claims, 3 Drawing Figures

U.S. Patent   June 29, 1976   3,965,520
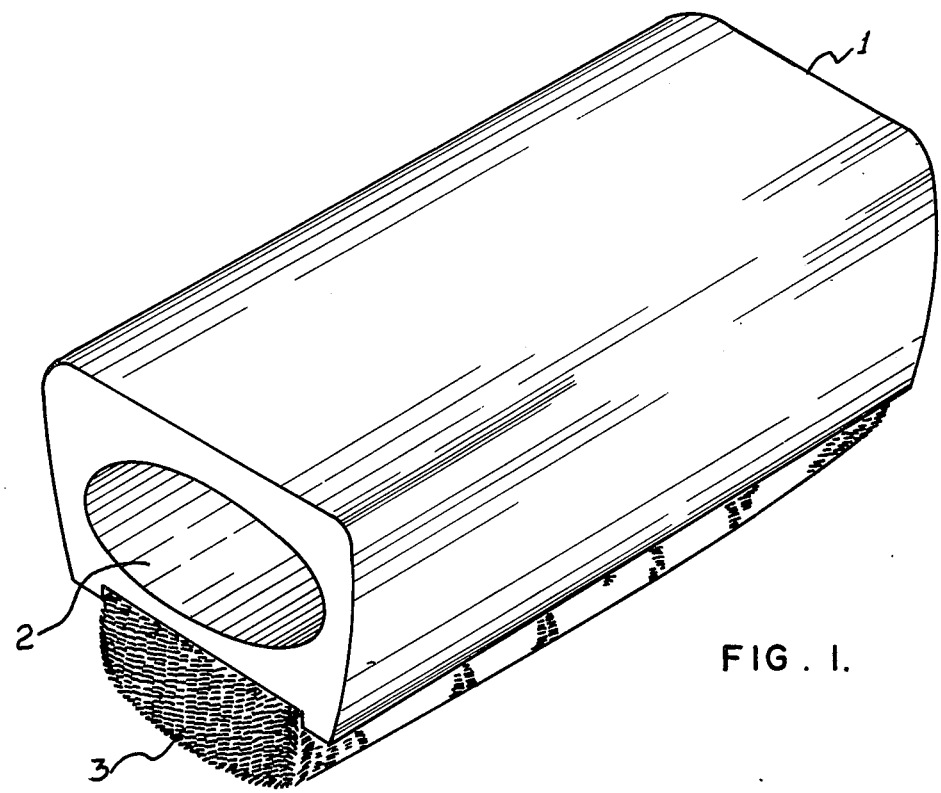
FIG. 1.
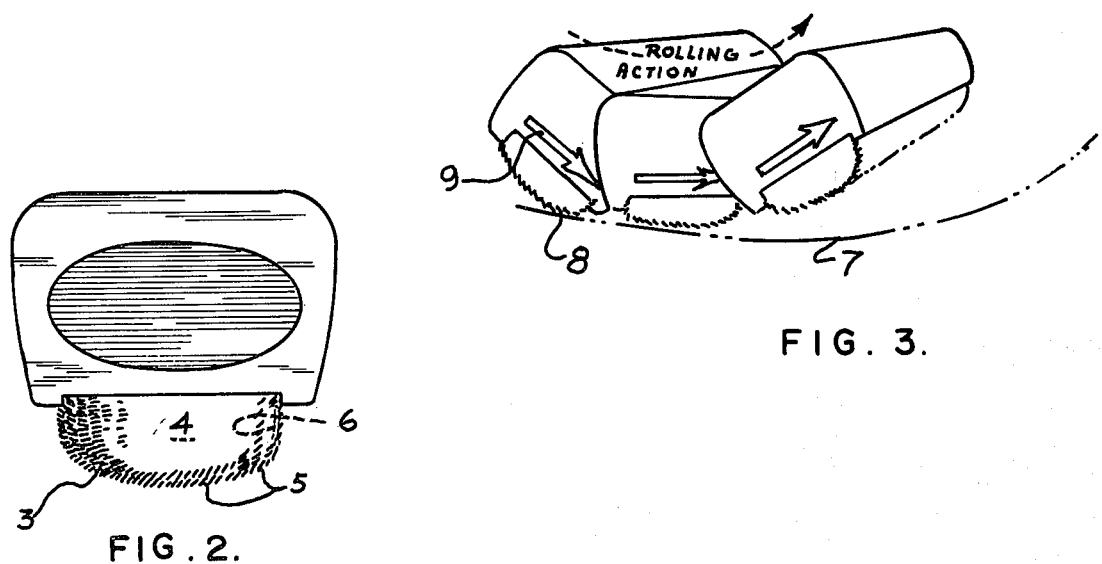
FIG. 2.
FIG. 3.

BRUSH AND CLEANING COMPOSITION FOR PHONOGRAPH RECORDS

This application is a division of application having Ser. No. 260,828, filed on June 8, 1972, now abandoned.

BACKGROUND OF THE INVENTION

This invention relates principally to a cleaning fluid that may effectively loosen microbial properties upon a surface, coagulate them by emulsification, and then removes said particles through the cooperation of a slanted pile brush.

Experimentation has shown that humidity upon a surface, as for example the plastic surface of a phonograph record, can serve as a life-support system for microorganisms in addition to the usual dirt particles. Such microbes, especially fungi, produce enzymes in an environment that can render them active enough to be so destructive as to actually etch a glass and plastic surface. When this activity occurs upon a phonograph record, since such records are usually formed from a vinyl resin, they may more easily cause irreversible damage.

Other types of cleaning fluids presently available and in common use usually do not take into consideration of the microbial additions usually accumulated upon material surfaces, and in particular subsurfaces, and in addition, they usually only contain fluid ingredients such as wetting agents and alcohols, principally to provide for wetting of the surface, and then dissolving of the dirt particles. In use, most of these prior fluids while being somewhat effective, usually fail to totally loosen all of the dirt upon the surface to be cleaned, and in particular, any microbes living thereon, and therefore, have a tendency to leave some residue dirt remaining upon the surface even after cleaning. Hence, prior cleaning fluids have a tendency to rearrange dust and dirt particles on the surface being cleaned, rather than lift all of the same from the surface for total cleansing.

In view of the foregoing, it can be stated that previous formulations of micro-surface cleaners have generally ignored the problem of microbial degradation, which provides the base support for formation of damage to the surface, or subsurface, and in addition provides a remaining and residue like oily film which promptly attracts and accumulates other dust and dirt particles immediately even though the surface may have just been cleaned. Many of these cleaning fluids for microgroove cleansing contain principally surfactants, such as glycerols and glycols alone, which have a tendency to act as intermediates which may even support growth of organisms. Many of these compounds are growth stimulatory to bacteria and fungi, and directly contribute to the sustained life of such organisms particularly in the hard to clean microgrooved subsurfaces. And, those prior cleaners containing un-linked alcohols and-/or aldehydes usually react with the plasticizer molecules, such as in records, rendering them undesirably more brittle.

In addition to the foregoing, the instrumentalities that have been heretofore employed for cleansing surfaces of the described nature are usually just cloth like in appearance, and provide little or no assistance in loosening the tightly adhering dirt particles, and even organisms, and usually just shift the dust and dirt that may be adhered thereon. In most instances, commercial cleaning fluids simply advise the user to employ any soft cloth in conjunction with the fluid.

It is, therefore, the principal object of this invention to provide a fluid cleaning composition which includes not only a surfactant for enhancing wetting of the surface to be cleaned, but contains in addition, an antimicrobial ingredient, and an emulsifier, so as to both loosen any organisms and provide for their accumulation for ease of removal.

Another object of the invention is to provide a cleaning composition that decontaminates the surface being cleaned.

In addition to the foregoing, another object of this invention is to provide a novel angularly piled brush which both facilitates the loosening of dirt particles from a surface, or subsurface, in addition to providing the means for retention of the loosened dirt, and its effective removal.

It is a further object of this invention to provide a cleaning fluid formulation which removes dirt particles and organisms which have a tendency to deteriorate plastic surfaces.

Other objects will become more apparent to those skilled in the art in the light of the following description and accompanying drawing.

SUMMARY OF THE INVENTION

It might be stated that the present invention provides a system that uniquely combines chemistry, microbiology, and fabric design to provide effective cleaning of a surface, its subsurface, or microgrooved surfaces. As previously described, the system consists of two components which cooperate together, namely, a unique fluid, and a specially designed brush which also serves as a storage unit for the fluid container. While the system has been found effective in cleaning a variety of material surfaces, or subsurfaces, it has been found most effective for cleaning the grooved surface of vinyl phonograph records.

The fluid is exclusively formulated to inhibit the growth of microorganisms, to solubilize destructive and groove-blocking fats and lipids (such as found on all human fingers) and to reduce the effective static potential of the record surface.

The brush of this invention is made of a developed fabric having a very fine, slanted and angularly oriented pile. The brush picks up and holds dirt when brushed against its angulated fibers, and the brush also soaks up, as in a form of capillary attraction, the fluid and the dirt mollified by the fluid. And, the angulated pile of this brush is designed to provide for release of its accumulated surface dirt and dust when brushed in an opposite direction on any other fabric surface.

The brush is designed having a frame member to which the pile cloth and intermediate cushioning is affixed, and a cavity is formed in the frame member of the brush to provide a storage location for the container holding the cleaning fluid of this invention.

The fluid of this system comprises a clear, aqueous solution for cleaning the type of surfaces previously identified. The fluid contains as ingredients various agents that function in the nature of surfactant, a microbial antagonist, an emulsifier for accumulation of dirt, and, in addition, may include a lubricant, which facilitates the efficient use of the cleaned surface, such as the side of a phonograph record.

A typical formulation for the fluid may comprise as follows:

| Ingredient | Percentage by Weight |
| --- | --- |
| Anti-microbe | up to 1 |
| Emulsifier | up to 1 |
| Surfactant | up to 1 |
| Liquid Carrier | at least 97 |

Another formulation for the fluid composition of this invention may be as follows:

| Ingredient | Percentage by Weight |
| --- | --- |
| Azide | up to 0.3 |
| Surfactant | between .005–.2 |
| Propylene Glycol | between .075 and .2 |
| Alcohol | between 0.01 and 5 |
| Water | remaining percent |

Another more specific formulation, and the one which has found effective commercial usage may be defined as follows:

| Ingredient | Percentage by Weight |
| --- | --- |
| Sodium Azide | .004 |
| Propylene Glycol | .005 |
| Surfactant | .075 |
| Distilled Water | 99.916 |
| | 100.00 |

The antimicrobial ingredient of the foregoing compositions has been found most effective when sodium azide is utilized, but other ingredients such as hexachlorophene, in percentages by weight of between 0.01 to 1%, or actinomycin, at percentages by weight between 0.1 to 1.0% have been found most effective. The surfactant, or wetting agent, utilized in this composition may be any of the variety of surfactants available commercially upon the market, such as Tween 80 and Span, comprising nonionic surface active agents, but the surfactant that has been found useful in this composition is octyl phenoxy polyethoxy ethanol (non inonic). An emulsifier and lubricant that has been found effective in this composition is propylene glycol as previously identified, but other such ingredients may be useful such as a poly alcohol, ethylene glycol, and glycerin. In addition, an alcohol, up to approximately 5%, may be added to this composition for cleansing purpose, and as a partial carrier, and any alcohol such as isopropyl, ethyl, or methyl, may be effective.

When a surface is contacted with one of the cleaning fluids as set forth above, it has a tendency to exhibit antimicrobial action, caused an emollienting of the dirtied surface, and soluabilization and subsequently an emulsification of the various lipids and organisms into the formation of micelles, with a resulting enhancement of the cleansing ability of the applied fluid. It may be stated that the ingredients of this composition, particularly the azide and the glycol when added to th surfactant poises the latter to that critical micelle concentration that must effectively aggregates the lipids for ease of removal. Then through the use of a brush of this invention, these aggregated and emulsified dirt components may be easily removed from the soiled surface.

It is also been found, through testing, that the fluid compositions of this invention have little or no chemical effect upon surfaces such as vinyl, and therefore do not damage the finely cut grooves of phonograph records.

BRIEF DESCRIPTION OF THE DRAWINGS

In the drawing, FIG. 1 discloses a perspective view of the cleaning brush of this invention;

FIG. 2 discloses a view of one end of the brush of FIG. 1; and

FIG. 3 discloses an illustration of the proper usage of the brush of this invention.

DESCRIPTION OF THE PREFERRED EMBODIMENT

In FIG. 1 of the drawing, there is disclosed the cleaning brush of this invention comprising a frame member 1, which is designed having curvature to allow for its convenient grasping by the hand as during usage of the same. Provided through one end of this frame member is a cavity 2 which is milled substantially inwardly, but not through, the body portion of the frame member 1, and is designed and having that size to accommodate a container of slightly less dimensions, and in which the cleaning composition of this invention is packaged. In the preferred form, the cavity 2 will extend perhaps three-fourths of the way through the frame member 1, but not all the way through the same.

As also viewed in FIG. 2, the bottom portion of the frame member 1 has a cloth means 3 mounted thereon, and to provide some softening of the cloth with respect to its mounting upon the frame member there is provided, intermediate thereof, and being covered entirely by the cloth, a cushioning means 4 which may be formed of expanded urethane, for other foam or cushioning filler. It is to be noted that the pile of the cloth 3 has its fibers 5 projecting angularly from the surface of the cloth from which they extend, and the orientation of these fibers has been found useful in facilitating the cleaning operation of surfaces, and particularly those surfaces formed having grooves therein. Desirably, and to add to the absorptive characteristics of the cloth 3, the inner side of the cloth, which would be at a location as shown along hidden line 6, if FIG. 2 was a cross sectional view of the brush, is un-backed, or lacking of projecting fibers or pile, and in this manner adds to the absorptive characteristics of the cloth and sponge portion of the brush.

The most effective way in which the brush can be used is illustrated in FIG. 3. For example, the outline provided at 7 may be the peripheral edge of a surface, as for example, a phonograph record, and the brush 1 may be applied for cleaning said surface as follows. An application of the fluid of this invention should be applied to the leading edge of the brush cloth, and in application, the fluid as applied to this edge of the brush probably should be sufficient to dampen the fabric at this location. Then, the damp leading edge of the brush, the leading edge being shown at 8, and which is pointed out by the direction of the arrow 9, should be applied to the rotating surface, and since the pile of the fabric is angularly pointing towards this leading edge, dust and debris upon the surface of the record will be picked up and absorbed into the fine pile of said brush. Likewise, the cleaning composition of this invention, which has been applied to this leading edge of the brush, will be simultaneously solubilizing any dirt compounds and microbes that are on the record surface. Then, the brush should be slowly rocked periodically so that alternately the surface will be moistened by the cleaning composition, and just thereafter the dry rear portion of the pile will contact the surface, which in this case is revolving, and pick up the loosened and softened dirt. Continued contact of the dry back portion of the brush upon the surface will eventually assist in drying of the now cleansed surface.

It should now be quite obvious that during this cleaning function, the angularly oriented fibers or pile of the brush are quite effective in extending against their grain into the microgrooves of any surface such as that provided on a phonograph record, and since this pile is angled against the movement of the brush and the revolving surface, there is a tendency for this pile to forcefully project into these grooves and dislodge contamination.

Numerous variations in the formulation of the cleaning fluid of this invention, or the construction of its brush, all within the scope of the appended claims, will occur to those skilled in the art in the light of the foregoing disclosure. The described embodiments and formulations are merely illustrative.

Having thus described the invention what is claimed and desired to be secured by Letters Patent is:

1. In combination with a cleaning composition comprising a mixture of a surfactant, an emulsifier, an anti-microbe consisting of a fungicide, and a liquid carrier, said composition being used in the cleansing of a phonograph record, a brush comprising a frame member which facilitates grasping by the hand, a cloth means mounted to said frame member, a cushioning means disposed between the exposed surface of said cloth means and the frame member, and the pile of said cloth being angularly oriented with respect to the surface of the cloth from which it projects to facilitate the loosening and retention of particles from the record grooves during the cleaning of the phonograph record through the use of said cleaning composition.

2. The combination of claim 1 and including a cavity formed in the frame member in which a container holding the cleansing composition may be inserted and carried.

3. The combination of claim 2 wherein the cavity opens at the end of said frame member.

* * * * *